US007043000B2

(12) United States Patent
Delaney et al.

(10) Patent No.: US 7,043,000 B2
(45) Date of Patent: May 9, 2006

(54) METHODS AND SYSTEMS FOR ENHANCING NETWORK SECURITY IN A TELECOMMUNICATIONS SIGNALING NETWORK

(75) Inventors: Robert J. Delaney, Raleigh, NC (US); John L. Hildebrand, Hillsborough, NC (US); James A. Young, Cary, NC (US)

(73) Assignee: Tekelec, Calabasas, CA (US)

( * ) Notice: Subject to any disclaimer, the term of this patent is extended or adjusted under 35 U.S.C. 154(b) by 64 days.

(21) Appl. No.: 10/234,924

(22) Filed: Sep. 4, 2002

(65) Prior Publication Data

US 2004/0042609 A1 Mar. 4, 2004

(51) Int. Cl.
*H04M 7/00* (2006.01)
*H04M 3/42* (2006.01)
(52) U.S. Cl. .............................. 379/221.08; 379/221.11; 379/201.01
(58) Field of Classification Search ........... 379/221.08, 379/221.11; 713/201.01, 200
See application file for complete search history.

(56) References Cited

U.S. PATENT DOCUMENTS

| 5,282,244 | A | * | 1/1994 | Fuller et al. ................. 379/230 |
| 5,701,301 | A | | 12/1997 | Weisser, Jr. |
| 5,862,334 | A | | 1/1999 | Schwartz et al. |
| 6,167,129 | A | | 12/2000 | Fikis et al. |
| 6,308,276 | B1 | | 10/2001 | Ashdown et al. |
| 2004/0049455 | A1 | * | 3/2004 | Mohsenzadeh .............. 705/40 |

OTHER PUBLICATIONS

CCS#7 Networks Dependability Studies: Phase 2, Network Integrity Aspects and Qualification Techniques—Access Control, vol. 1 of 3: Main Core, dated Jun. 1998, (37 pages).
CCS#7 Networks Dependability Studies: Phase 2, Network Integrity Aspects and Qualification Techniques—Access Control, vol. 2 of 3: Annex A—Protocol Analysis in Access Control, dated Jun. 1998 (44 pages).
CCS#7 Networks Dependability Studies: Phase 2, Network Integrity Aspects and Qualification Techniques—Access Control, vol. 3 of 3: Annex B—Test Suite For Access Control dated Jun. 1998 (50 pages).
CCS#7 Networks Dependability Studies: Phase 2, Network Integrity Aspects and Qualification Techniques—Congestion Control and Failure Propagation, vol. 3 of 3: Annex B, Jul. 1998 (138 pages).
CCS#7 Networks Dependability Studies: Phase 2, Network Integrity Aspects and Qualification Techniques—Restart (Continued)

*Primary Examiner*—Benny Tieu
*Assistant Examiner*—Karen Le
(74) *Attorney, Agent, or Firm*—Jenkins, Wilson, Taylor & Hunt, P.A.

(57) ABSTRACT

Methods and systems for providing enhanced network security for network management messages and subsystem management messages are disclosed. A network security function receives a network or subsystem management message from a first location in a network. The network security function determines whether one or more predetermined parameters in the network management message are not associated with the originating location. In response to determining that are not associated with the originating location, a network security action, such as discarding the message and/or notifying a network operator, is performed.

35 Claims, 9 Drawing Sheets

OTHER PUBLICATIONS

Procedure and Line Oscillation, vol. 1 of 3: Main Report dated Aug. 1998 (38 pages).

CCS#7 Networks Dependability Studies: Phase 2, Network Integrity Aspects and Qualification Techniques—Restart Procedure and Link Oscillation, vol. 2 of 3: Annex A—Detailed Analysis, dated Aug. 1998 (98 pages).

CCS#7 Networks Dependability Studies: Phase 2, Network Integrity Aspects and Qualification Techniques—Restart Procedure and Link Oscillation, vol. 3 of 3: Annex B—Test Suite Production, dated Aug. 1998 (140 pages).

CCS#7 Networks Dependability Studies: Phase 2, Network Integrity Aspects and Qualification Techniques, dated Aug. 1998 (33 pages).

* cited by examiner

METHODS AND SYSTEMS FOR ENHANCING NETWORK SECURITY IN A TELECOMMUNICATIONS SIGNALING NETWORK

TECHNICAL FIELD

The present invention relates to increasing security in a telecommunications network. More particularly, the present invention relates to methods and systems of increasing security by not allowing messages that should not be received to be forwarded in a telecommunications network for the purposes of improving network security.

BACKGROUND ART

In many parts of the world, including North America, national telephone networks that were once controlled by a relatively small number of large operators have been opened to competition. One result of this open competitive market has been the rapid proliferation of smaller service providers and an associated host of additional network-to-network interconnection requirements. These network interconnections expose the signaling system 7 (SS7) networks of both the pre-existing as well as the new service providers to new risks, despite the fact that network access is still tightly controlled and inter-operating telephone companies sign agreements and follow procedures to preserve the integrity of their networks.

To ensure the stability and integrity of the networks, operators were forced to develop and adopt more aggressive protective measures. For example, the SS7 protocol and signaling point behavior were enhanced with gateway screening (GWS) functions to block data packets from entering an SS7 network if they did not conform to a predefined format and content. This signaling message screening functionality is commonly employed in telephony signaling networks worldwide and is well defined and described in a number of telecommunication industry standard specifications, including GR-246-Core, *Telcordia Technologies Specification of Signaling System Number 7*, Issue 6, December 2001, and GR-82-Core, *Signaling Transfer Point Generic Requirements*, Issue 4—December 2000, the disclosures of each of which are incorporated herein by reference in its entirety.

In an STP, gateway screening provides the mechanism for preventing unwanted signaling messages from being allowed into and/or routed through the node. In an SS7 signaling environment, these signaling messages may include ISDN user part (ISUP) messages, telephony user part (TUP) messages, transaction capability application part (TCAP) messages, and mobile application part (MAP) messages. TCAP and MAP messages typically require the services of a signaling connection control part (SCCP) protocol layer and, consequently, are sometimes referred to as SCCP messages. In addition to these user messages, both message transfer part (MTP) and SCCP level subsystem management messages are also commonly transmitted and received through an SS7 signaling network.

By carefully analyzing their network topologies, as well as their interconnections to external networks, a network operator can construct a comprehensive set of GWS rules, which ensure that only signaling messages originated by a known group of signaling points are allowed into the operator's network. Similarly, GWS rule sets can be created which permit only messages associated with certain network services to enter an operator's network. The application of GWS rules, such as those described above, are most useful and primarily intended to prevent unauthorized access to network operator's resources. That is, GWS provides operators with a method for monitoring and enforcing agreements associated with transporting signaling traffic and the accessing of network service resources (e.g., service control points, etc.) by essentially defining a set of all signaling points with which communications are allowed, and/or service types that are supported.

In addition to user messages (e.g., ISUP, TCAP, MAP, etc.), certain types of network management messages require "affected" destination field (MTP network management) or affected point code/subsystem field (SCCP subsystem management) screening. For example, an MTP transfer prohibited (TFP) message received from an adjacent signaling point indicates to network management processes at an STP that the point code specified in the affected destination field of the message is prohibited. Such affected destination GWS rules can ensure that an affected point code or destination field value specified in a received network management message is, in fact, a network address that is known to the receiving node. Without this type of GWS, an interconnecting network could accidentally send a network management message that includes an invalid affected point code or destination field value to a signaling point within an adjacent network.

While such GWS algorithms provide some degree of network security for accidental or non-malicious scenarios, substantial vulnerability to malicious activity continues to exist in signaling networks. A main disadvantage of traditional gateway screening is that it is primarily a reactive method that requires manual intervention to analyze new messages to be screened. To further illustrate this point, consider the network signaling scenario shown in FIG. 1. FIG. 1 includes an exemplary SS7 network, generally indicated by reference numeral 150, which is comprised of a number of network elements including a first service switching point (SSP) 152, a second SSP 154, a third SSP 156, a service control point (SCP) 158, a first STP node 160, a second STP node 162, a third STP node 164, and fourth STP node 166. The four STP nodes are fully interconnected via SS7 signaling linksets (e.g., LS2 and LS3), while each SSP node is connected to at least one of the STP nodes. More particularly, SSP node 156 is coupled to STP 160 via an SS7 signaling linkset LS1. SCP node 158, which is assigned an SS7 point code of 1-1-1, is similarly coupled to STP 164 via an SS7 signaling link.

While existing GWS screening implementations may provide a technique for preventing signaling messages to or from unauthorized point code addresses, existing GWS technology does not provide significant protection from malicious attacks using "authorized" point code addresses. Referring again to FIG. 1, it will be appreciated that if a malicious individual or organization were to gain access to a network signaling point, such as SSP 156, malicious SCCP subsystem management messages could be constructed and communicated to STP 160 via signaling linkset LS1. Such a malicious message might include an SCCP subsystem prohibited (SSP) subsystem management message with a "valid" OPC value equal to that of SSP 156, as well as a "valid" affected point code/SSN value equal to that of SCP node 158 (i.e., APC/SSN=1-1-1/12). Since the OPC and APC/SSN values in the subsystem management message are both valid addresses, gateway screening on STP 160 would not identify such messages as anomalistic and potentially threatening, even though such a network management message should never be received on LS1. It will be appreciated that under normal circumstances, the SSP message described above should only be received at STP 160 via LS2 or LS3.

SCCP subsystem management processes on STP 160 may subsequently notify other concerned nodes in the network (e.g., SSP 152) that subsystem 12 of SCP node 158 is unavailable. Widespread and coordinated dissemination of such malicious network management messages within a signaling network could potentially disrupt and disable telephone communications on a large scale.

Moreover, other than a check as to whether the affected point code in the subsystem management message is known to the receiving node, there is nothing to prevent an attacker from originating malicious subsystem or network management message from a valid point code and adversely affecting nodes at other locations in the network. Allowing an attacker to bring down network resources in other locations from a single location is undesirable.

Therefore, what is needed is an improved signaling message security technique that is capable of identifying and mitigating malicious network and subsystem messages in a signaling network.

DISCLOSURE OF THE INVENTION

The present invention includes improved network security functions that prevent malicious network and subsystem management messages originating from one location in a network from adversely affecting nodes at other locations in the network. According to one aspect, the present invention includes an SS7 network routing node for receiving network and subsystem management messages, including MTP network and SCCP level subsystem management messages, and for applying one or more enhanced network management security algorithms. The security algorithms may determine whether a network or subsystem management message originating from a first location in the network includes one or more predetermined parameters that do not pertain to the originating location. In response to determining that a received signaling message includes one or more of these parameters that do not pertain to the originating location, the signaling message may be discarded and a network operator may be notified.

A first enhanced security algorithm may determine whether a received network management message was originated by an adjacent network element. A second enhanced security algorithm may determine whether a route exits to the OPC in a received network management message for the signaling linkset over which a network management message was received. A third enhanced security algorithm may determine whether a route exists to the affected point code or destination parameter in a received network or subsystem management message for the linkset over which the message was received.

Accordingly, it is an object of the invention to provide improved methods and systems for identifying malicious network management messages.

It is another object of the invention to provide improved methods and systems for identifying malicious subsystem management messages.

It is yet another object of the invention to prevent network management and subsystem management messages originating from one location in the network from adversely affecting nodes at other locations in the network.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

According to one embodiment, the present invention includes an SS7 signaling network element, such as an STP routing node, that improves signaling network integrity and security by providing an enhanced signaling message security function. The enhanced message security STP node is described and illustrated herein as a collection of processes and subsystems that execute on cards to perform enhanced discrimination of signaling messages as well as message routing and other application specific processing (e.g., number portability, flexible mobile services node routing, global title translation, etc.). It is understood that these cards may each include one or more general purpose microprocessors and memory devices. Accordingly, the processes, databases, applications, and subsystems described herein may be implemented by computer-executable instructions embodied in a computer-readable medium. Alternatively, the processes, databases, applications, and subsystems described herein may be implemented in hardware as application-specific integrated circuits (ASICs). Any combination of hardware, software, or hardware and software for performing enhanced signaling message security as described herein is intended to be within the scope of the invention.

Enhanced Security STP Node Architecture

Figure 1:
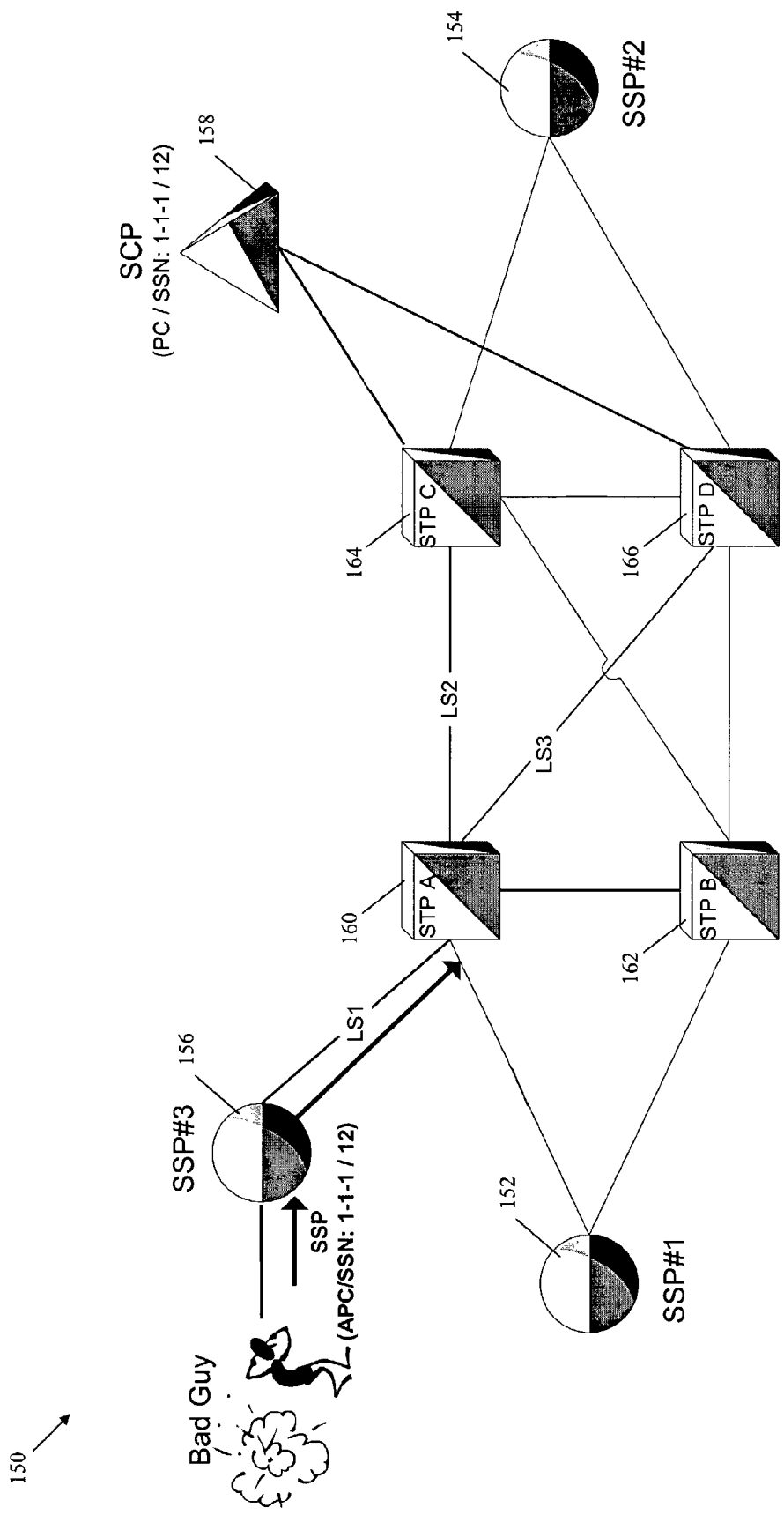
FIG. 1 is a network diagram illustrating an exemplary signaling message security breach scenario in an SS7 signaling network.
Figure 2:
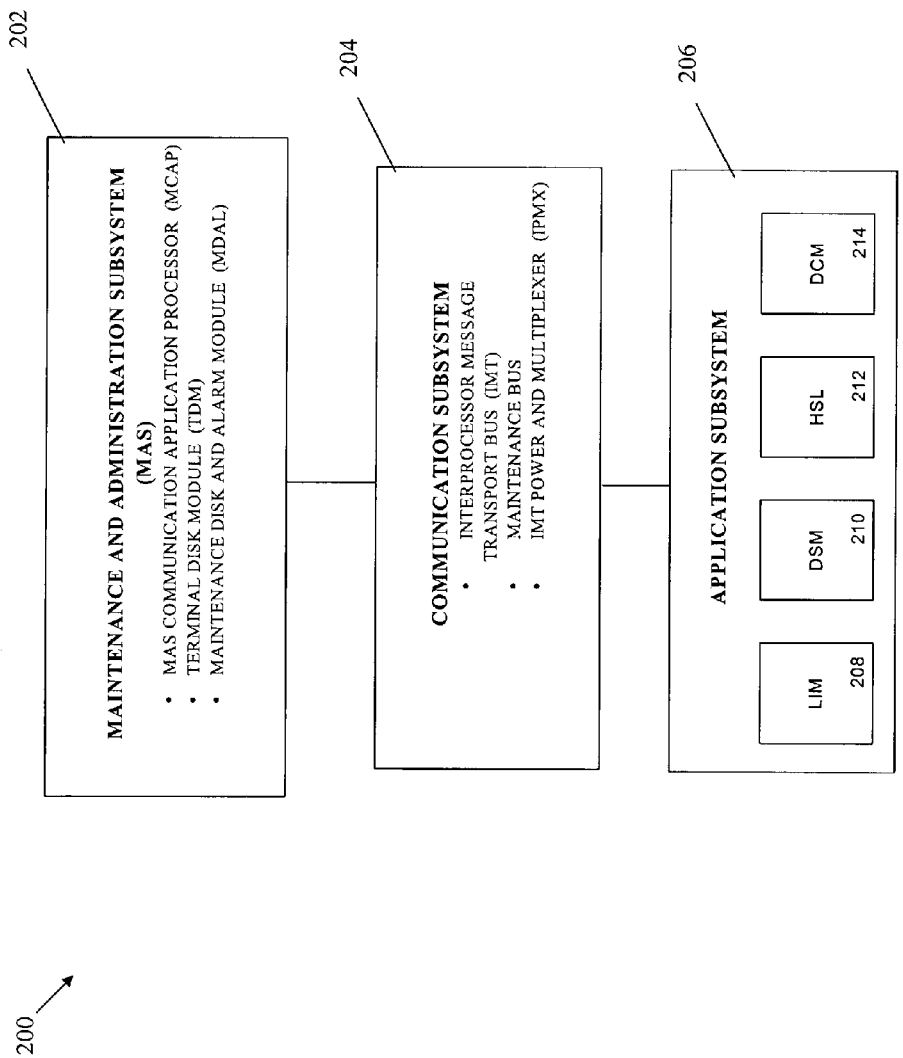
FIG. 2 is a block diagram illustrating an exemplary underlying hardware platform of an STP on which a network security function according to an embodiment of the present invention may be implemented.

Disclosed herein are several embodiments of the present invention, which may include an underlying hardware platform similar to that of a traditional telecommunications network routing switch, such as a signaling system 7 (SS7) signal transfer point (STP). FIG. 2 illustrates an exemplary underlying hardware platform suitable for use with embodiments of the present invention. In FIG. 2, STP 200 includes the following subsystems: a maintenance and administration subsystem (MAS) 202; a communication subsystem 204; and an application subsystem 206. MAS 202 provides maintenance communications, initial program load, peripheral services, alarm processing and system disks. Communication subsystem 204 includes an interprocessor message transport (IMT) bus that is the main communication bus among all subsystems in STP 200. The IMT bus includes two counter-rotating rings.

Application subsystem 206 includes application cards that are capable of communicating with the other cards through the IMT buses. Numerous types of application cards can be incorporated into STP 200, including: a link interface module (LIM) 208 that provides an interface to SS7 signaling links; a database services module (DSM) 210 that hosts a variety of applications, such as number portability service, global title translation service, and flexible mobile services routing service, and a high-speed link interface module (HSL) 212 that provides an interface to asynchronous transfer mode (ATM) signaling links. In addition, STP 200 may include a data communication module (DCM) 214 that sends and receives Internet protocol (IP)-encapsulated SS7 messages over an IP network. DCM 214 may implement one or more adaptation layers to send and receive SS7 traffic over IP, including M2PA, M2UA, M3UA, SUA, and TALI, as described in the corresponding IETF Internet Drafts and RFCs. In addition, DCM 214 may implement TCP, UDP, or SCTP as its transport layer for sending and receiving signaling messages.

Figure 3:
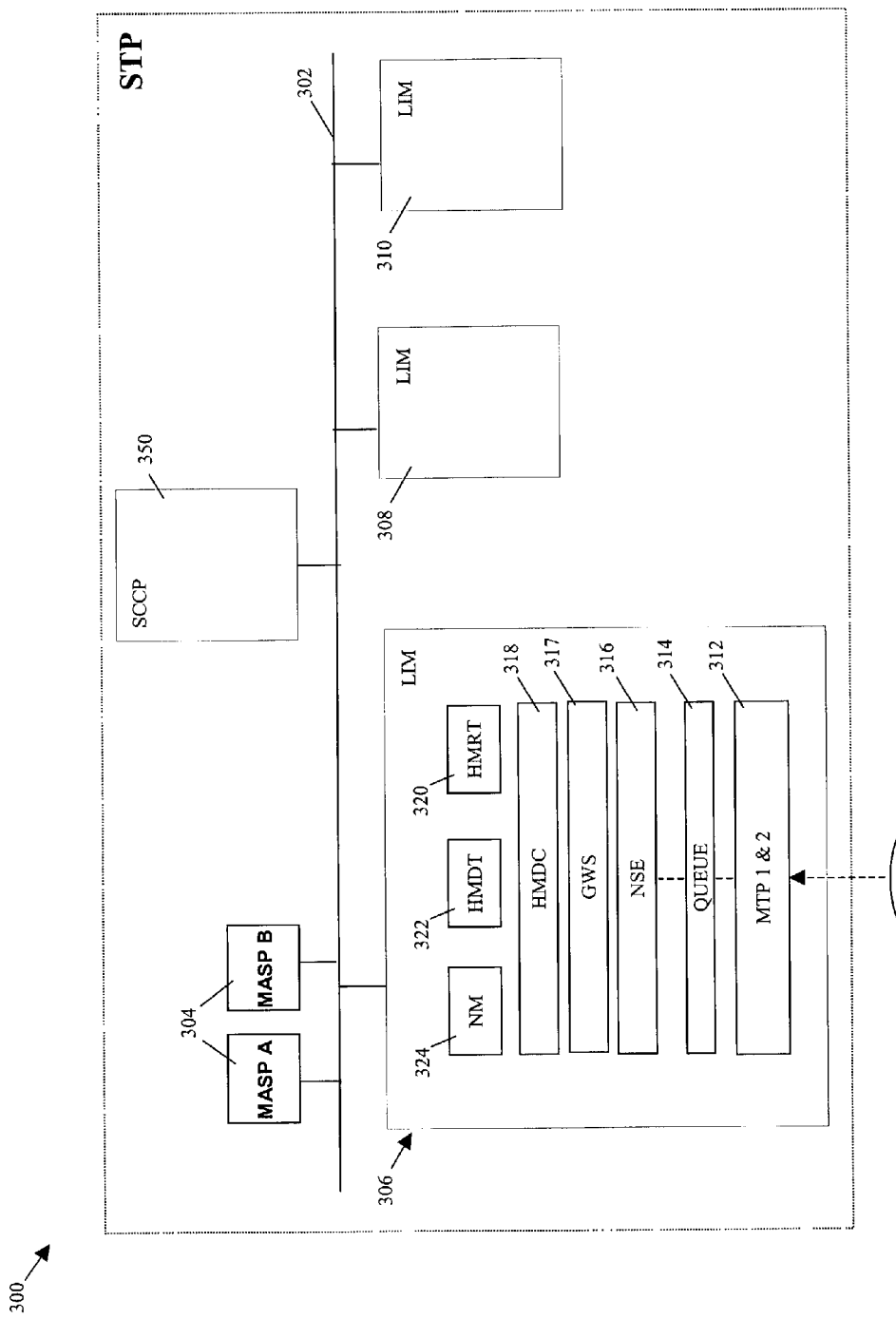
FIG. 3 is a diagram illustrating an exemplary internal architecture of STP node including a network security function according to an embodiment of the present invention.

FIG. 3 illustrates an STP including an enhanced network security function according to an embodiment of the present invention. In FIG. 3, an enhanced security STP routing node 300 includes a high-speed IMT communications bus 302 and a plurality of cards or processing modules coupled to IMT bus 302. In the illustrated example, these cards include a pair of maintenance and administration subsystem processors (MASPs) 304, a first SS7 capable LIM 306, a second SS7 capable LIM 308, and a third SS7 capable LIM 310. These modules are physically connected to the IMT bus 302 such that signaling and other type messages may be routed internally between active cards or modules. For the purposes of discussion, only the single LIM processor 306 is illustrated in detail. However, it is assumed that LIMs 308 and 310 are similarly configured. In addition, the present invention is not limited to an STP with three LIMs as illustrated in FIG. 3. Any number of LIMs, DCMs, or other cards may be included in an STP according to the present invention, depending on the number and type of signaling links. MASP pair 304 implements the maintenance and administration subsystem functions described above. As MASP pair 304 are not particularly relevant to a discussion of the network security attributes of the present invention, a detailed discussion of their function is not provided herein.

Link Interface Module (LIM) Architecture

Referring again to FIG. 3 and focusing now on LIM card functionality, 306 includes an SS7 message transfer part (MTP) function 312 that supports MTP level 1 and 2 processing of inbound and outbound SS7 signaling messages, an I/O buffer or queue 314, a signaling message security function, network security enhancements (NSE) 316 that provides the enhanced security capabilities of the present invention, a Gateway Screening (GWS) function 317, an SS7 MTP level 3 message handling and discrimination (HMDC) function 318, a message handling and routing (HMRT) function 320, a message handling and distribution (HMDT) function 322, and a network management function 324.

MTP level 1 and 2 function 312 provides the facilities necessary to send and receive digital data over a particular physical media/physical interface, such as a DS0 type communication link. In addition, MTP level 1 and 2 function 312 provides error detection, error correction, and sequenced delivery of SS7 message packets. I/O queue 314 provides for temporary buffering of incoming and outgoing SS7 signaling message packets.

NSE function 316 receives signaling messages from message buffer 314 and subsequently applies one or more message screening algorithms. Messages that are received by NSE function 316 and that do not pass or satisfy the associated enhanced security criteria may be discarded or subjected to another network security action. HMDC function 318 receives signaling messages from the lower processing layers and performs a discrimination function, effectively determining whether an incoming SS7 message packet requires internal processing or is simply to be through switched. HMRT function 320 receives and routes messages from HMDC function 318 that do not require further processing at the STP node and are simply to be through switched. Table 1 shown below illustrates exemplary routing data that may be used by HMRT function 318.

TABLE 1

SS7 Routing Data
SS7 Route Table

| KEY | DATA FIELDS | | | | | |
|---|---|---|---|---|---|---|
| Point Code | Route Cost | Adj Node | LinkSet Status | Adjacent Status | Overall Status | LinkSet Name |
| 2-1-3 | 10 | Yes | A | A | A | LS1 |
| 2-1-1 | 10 | Yes | A | A | A | LS4 |
| 2-1-1 | 10 | Yes | A | A | A | LS5 |
| 3-1-2 | 10 | Yes | A | A | A | LS5 |
| 3-1-2 | 20 | Yes | A | P | P | LS2 |
| 3-1-2 | 30 | Yes | A | A | A | LS3 |
| 1-1-1 | 10 | No | A | A | A | LS2 |
| 1-1-1 | 20 | No | A | A | A | LS3 |
| 3-1-3 | 10 | Yes | A | A | A | LS2 |

The exemplary SS7 routing data presented in Table 1 include: a destination SS7 point code field; a route cost or preference indicator; an adjacent node indicator; a signaling linkset status indicator ("A"=available, "P"=prohibited); an adjacent node status indicator; an overall route status indicator; and a linkset identifier. HMDT function 322 distributes messages that require internal processing by STP 300 to the appropriate internal processing module. Network management function 324 receives and processes network management messages and distributes relevant network status information to other communication and application modules in the STP. In certain circumstances, NM function 324 may also generate network management messages and route these messages to other "concerned" nodes in the signaling network.

SS7 Network and Subsystem Management Messages

In an SS7 signaling network environment, network management messages include MTP3 network management messages. Subsystem management messages include SCCP subsystem management messages. Network and subsystem management messages are identified within the SS7 signaling protocol by a service indicator (SI) parameter that is contained in SS7 message signaling units. Table 2 shown below illustrates SI parameter values and their corresponding message type meanings within the SS7 protocol. From Table 2, it will be appreciated that an SI parameter value of 0 is indicative of an MTP level signaling network management (SNM) message, while an SI value of 3 indicates an SCCP message. With regard to SCCP level subsystem management messages, additional parameters within an SCCP message must be examined to determine whether the message contains SCCP subsystem management information. These SCCP message parameters will be described in detail below.

TABLE 2

MSU Service Indicator Parameter Values

| SI Code | Msg Type |
| --- | --- |
| 0 | SNM |
| 1 | SNT |
| 3 | SCCP |
| 4 | TUP |
| 5 | ISUP |
| 6 | DUP |
| 7 | DUP |
| 13 | BICC |

MTP Network Management Messages

Figure 4:
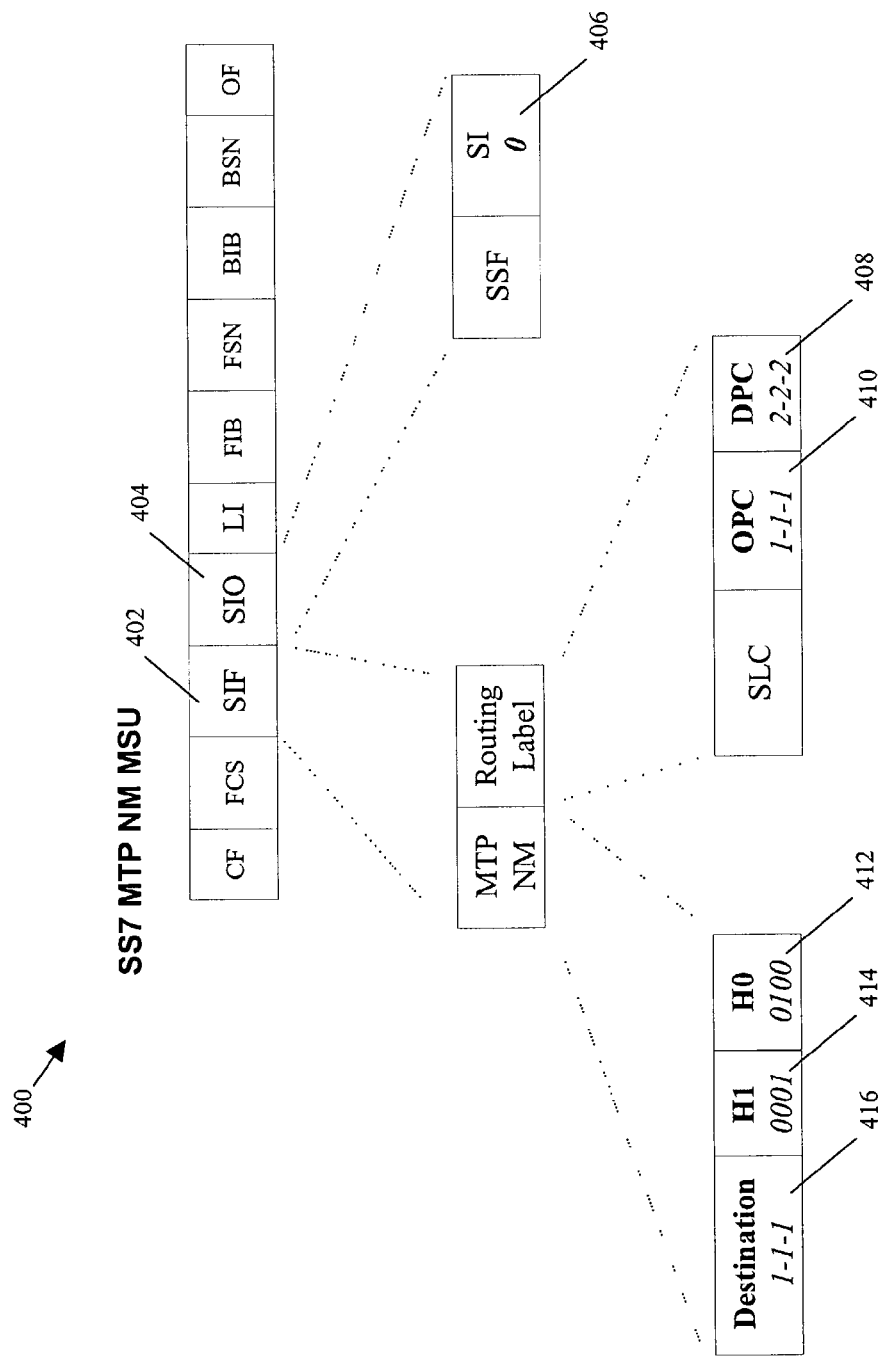
FIG. 4 is a message diagram illustrating the structure of an SS7 message transfer part (MTP) level network management message.

Table 3 shown below is a partial listing of MTP level network management messages and message groups. Once again, these are SS7 signaling messages that are identified by an SI parameter value of 0. FIG. 4 illustrates an exemplary SS7 MTP level network management message, generally indicated by reference numeral 400. MSU 400 includes a signaling information field (SIF) 402 and a service indicator octet (SIO) field 404, which further includes a service indicator parameter 406. SIF field 402 includes MTP routing label information, including a DPC parameter 408 and an OPC parameter 410. SIF field 402 also includes two additional parameters that are used to uniquely identify the specific type of network management message. These parameters are referred to in the SS7 signaling protocol as H0 412 and H1 414.

TABLE 3

SS7 MTP Network Management Messages

| Msg/Group | Description |
| --- | --- |
| RSM | Route Set Test Messages (RSP, RSR, RCP, RCR) |
| RSP | Route Set Test Prohibited |
| RSR | Route Set Test Restricted |
| RCP | Route Set Test Cluster Prohibited |
| RCR | Route Set Test Cluster Restricted |
| RCT | Route Set Congestion Test |
| TFM | Transfer Messages (TCP, TCR, TFA, TFC, TCA, TFP, TFR) |
| TCP | Transfer Cluster Prohibited |
| TCR | Transfer Cluster Restricted |
| TFA | Transfer Allowed |
| TFC | Transfer Controlled |
| TCA | Transfer Cluster Allowed |
| TFP | Transfer Prohibited |
| TFR | Transfer Restricted |
| UPU | User Part Unavailable |

The H0 and H1 parameters together include one byte of information. Table 4 illustrates the mapping of MTP network management messages and message groupings to H0 and H1 parameter values. For example, the MTP network management message 400 represented in FIG. 4 contains an H0 value of 0100 and an H1 value of 0001, and consequently would be identified as a transfer prohibited (TFP) message. Another parameter that is often contained in SIF field 402 is a destination parameter 416. As discussed above, the destination parameter in an MTP level network management message is used to identify an affected node or network element.

TABLE 4

Signaling Network Management Heading Codes

| Msg Group | H0 | H1 0001 | 0010 | 0011 | 0100 | 0101 | 0110 | 0111 | 1000 |
| --- | --- | --- | --- | --- | --- | --- | --- | --- | --- |
| CHM | 0001 | COO | COA | | | CBD | CBA | | |
| ECM | 0010 | ECO | ECA | | | | | | |
| FCM | 0011 | RCT | TFC | TFR | TCR | | | | |
| TFM | 0100 | TFP | TCP | RCP | RCR | TFA | TCA | | |
| RSM | 0101 | RSP | RSR | LIA | LUA | | | | |
| MIM | 0110 | LIN | LUN | | | LID | LFU | LLI | LRI |
| TRM | 0111 | TRA | TRW | CNS | CNP | | | | |
| DLM | 1000 | DLC | CSS | | | | | | |
| UFC | 1010 | UPU | | | | | | | |

SCCP Subsystem Management Messages

Figure 5:
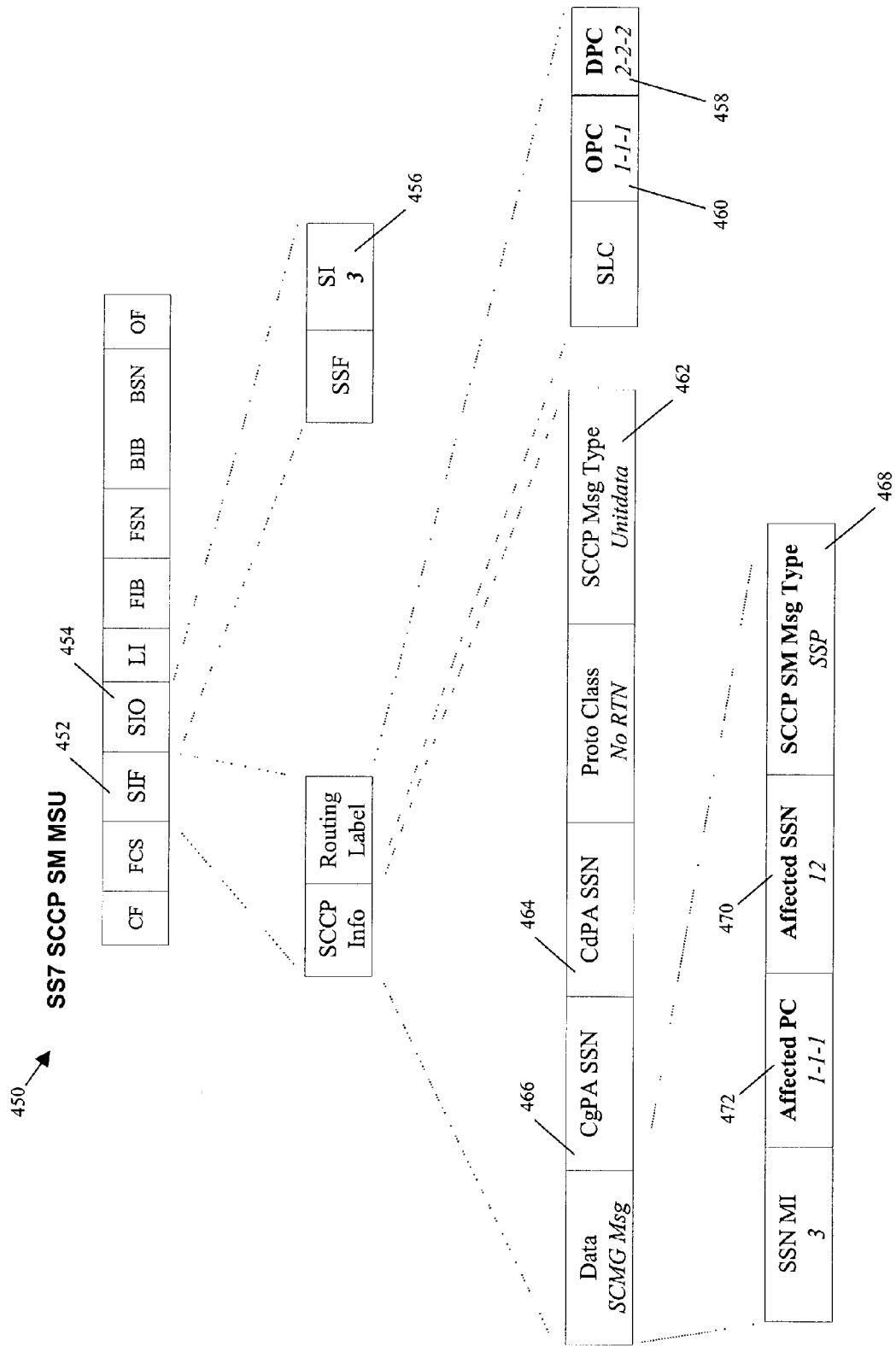
FIG. 5 is a message diagram illustrating the structure of an SS7 signaling connection control part (SCCP) level subsystem management message.

Table 5 shown below includes is a listing of SCCP level subsystem management messages. Again, as indicated in Table 2, these are SS7 signaling messages that are partially identified by an SI parameter value of 3. FIG. 5 illustrates an exemplary SS7 SCCP level subsystem management message, generally indicated by reference numeral 450. MSU 450 includes a signaling information field (SIF) 452 and a service indicator octet (SIO) field 454, which further includes a service indicator parameter 456. SIF field 452 includes MTP routing label information. The MTP routing label information includes a DPC parameter 458 and an OPC parameter 460. SIF field 452 also includes a number of additional SCCP parameters that may be used to uniquely identify the specific type of the SCCP message. More particularly, an SCCP message type parameter 462, a called party SSN parameter 464, and a calling party SSN parameter 466 may be included in the SCCP message. In the sample SCCP message 450 shown in FIG. 5, the SCCP message type parameter 462 identifies the message as a Unitdata message. The called and calling party SSN parameters 464 and 466 indicate the Unitdata message contains an SCCP management (SCMG) message. As such, additional SCMG information may be contained in the message. This information includes an SCCP subsystem management message type indicator 468, an affected SSN parameter 470, and an affected point code parameter 472.

TABLE 5

SCCP subsystem management message Type Codes

| SCCP SM Code | SCCP SM Message |
| --- | --- |
| 0000 0001 | Subsystem Allowed (SSA) |
| 0000 0010 | Subsystem Prohibited (SSP) |
| 0000 0011 | Subsystem Status Test (SST) |
| 0000 0100 | Subsystem Out Of Service Request (SOR) |
| 0000 0101 | Subsystem Out Of Service Grant (SOG) |
| 1111 1101 | Subsystem Backup Routing (SBR) |
| 1111 1110 | Subsystem Normal Routing (SNR) |
| 1111 1111 | Subsystem Routing Status Test (SRT) |

Enhanced MTP Network Management Message Security Algorithm

The enhanced security algorithm of the present invention for MTP level network management messages can be expressed using the rules listed below.

For a received MTP level network management message:
1) The OPC of the MTP network management message must be associated with an adjacent point code;
2) The receiving STP must have a route to the OPC of the MTP network management message on the signaling linkset over which the message was received; and
3) The receiving STP must have a route to the destination parameter contained in the MTP network management message (if the received message contains destination parameter information) on the signaling linkset over which the message was received.

For all link types, the following additions/exceptions apply:
Rule #3 does not apply to RSM messages (i.e., RSP, RSR, RCP, RCR); and
Rule #1 does not apply to UPU, TFC and RCT messages.

In the embodiment illustrated in FIG. 3, the MTP level screening algorithm of the present invention is implemented in the NSE function 316 on each LIM in the STP 300. The enhanced security algorithms of the present invention may be implemented as software logic in compiled computer code that is executed on each LIM of the STP system 300. Alternatively, the algorithms may be implemented on each LIM in a data table driven architecture so as to permit algorithm data modifications without requiring associated computer software source code to be re-compiled.

Figure 6:
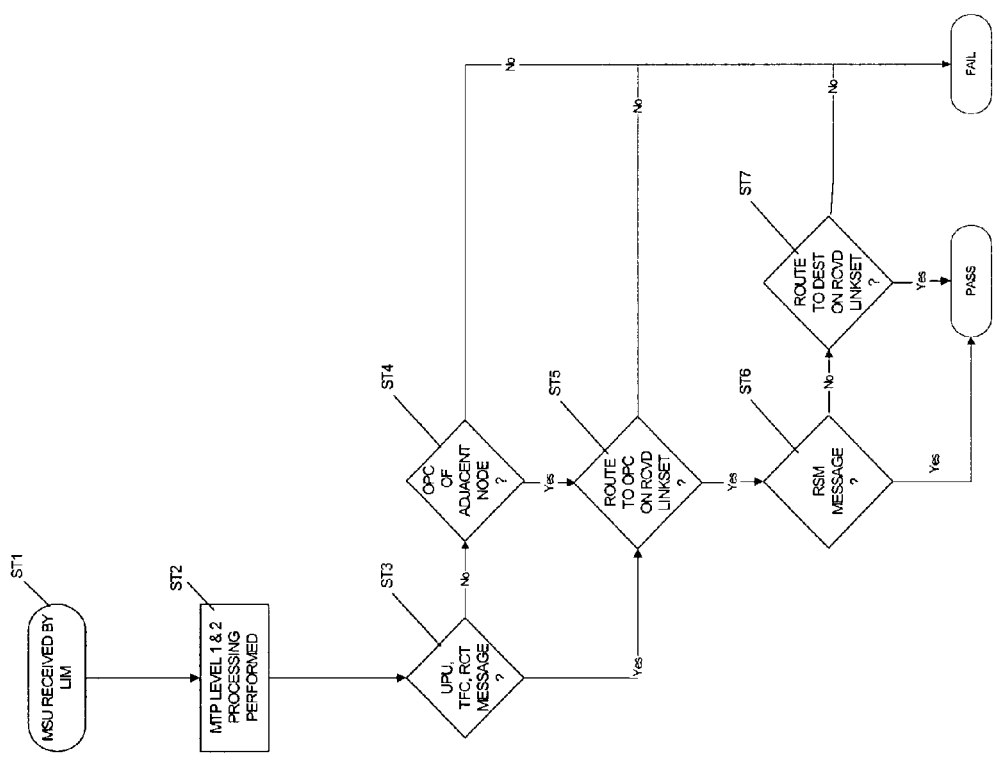
FIG. 6 is a flow chart diagram that illustrates message processing associated with an MTP level enhanced security function according to an embodiment of the present invention.

FIG. 6 is a process flow diagram that illustrates the MTP level network management message security algorithm according to an embodiment of the present invention. The enhanced security algorithm depicted in FIG. 6 is described in terms of a LIM module implementation. In step ST1, an SS7 MSU is received at LIM 306 of STP 300 on an inbound signaling linkset. MTP level 1 and 2 processing is performed (ST2) via MTP function 312, and the MSU is passed to I/O message buffer 314. I/O buffer 314 subsequently directs the message to NSE function 316 for application of the enhanced screening algorithms of the present invention. NSE function 316 receives the message, decodes and examines various parameters including at least some of the parameters that are illustrated in FIG. 4. For MTP network management messages, NSE function 316 examines the H0 and H1 parameters in step ST3 to determine whether the MTP network management message is a UPU, TFC, or RCT message (See Table 4). If, in step ST3, it is determined that the received message is a UPU, TFC, or RCT network management message, the enhanced security algorithm of the present invention skips step ST4 where it is determined whether the OPC in the message represents an adjacent node.

However, if, in step ST3, it is determined that the received message is not a UPU, TFC, or RCT network management message, step ST4 is not skipped. If it is determined that the point code contained in the OPC field of the received message does not correspond to the point code of an adjacent signaling point; that is, a signaling point that is directly connected to the receiving STP node, then the message fails the enhanced security algorithm. NSE function 316 may perform one or more network security actions in the event of an enhanced security algorithm failure. Network security actions may include discarding the message, generating an alarm, and updating security log data to indicate that the message failed the security algorithm.

If it is determined that the point code contained in the OPC field of the received message corresponds to the point code of an adjacent signaling point, then a determination is next made as to whether a route to the OPC specified in the message is defined on the same signaling linkset over which the message was received (ST5). Such a determination is made by consulting an SS7 route table on LIM 306 similar to sample Table 1 described above.

If it is determined that a route to the OPC specified in the message is not defined on the same signaling linkset over which the message was received, then the message fails the enhanced security algorithm and invokes one or more network security actions in response to the security algorithm failure. If it is determined that a route to the OPC specified in the message is defined on the same signaling linkset over which the message was received, then the H0 and H1 parameters are examined in step ST6 to determine whether the MTP network management message is one of the messages included in the RSM message group (See Table 4). If it is determined that the received message is one of the collection of RSM messages, the enhanced security algorithm "passes" the message and concludes processing for this message.

If it is determined that the received message is not one of the collection of RSM messages, then the message is examined to determine the value of a destination parameter (if the destination parameter is present in the message). The destination parameter should not be confused with the destination point code parameter in the message. In MTP3 network management messages, the destination parameter specifies the point code of the node that the network management message is concerning. Using the point code specified in the destination field, it is then determined whether a route to the point code specified in the destination field is defined on the same signaling linkset over which the message was received (ST7). The reason for this check is that a node should not be allowed to originate an MTP3 network management message for nodes of which it should not have direct knowledge. In general, for MTP3 network management messages, a node should only have knowledge of nodes to which it has a route. If the receiving STP determines that no route exists on the linkset for the point code specified in the destination field, then the sending node should not have knowledge of that node and the network management message should be discarded.

Accordingly, if it is determined that a route to the destination parameter point code address is not defined on the same signaling linkset over which the message was received, then the message fails the enhanced security algorithm and invokes one or more network security actions in response to the security algorithm failure. If it is determined that a route to the destination parameter point code address specified in the message is defined on the same signaling linkset over which the message was received, then the enhanced security algorithm "passes" the message and concludes processing of this message.

Figure 7:
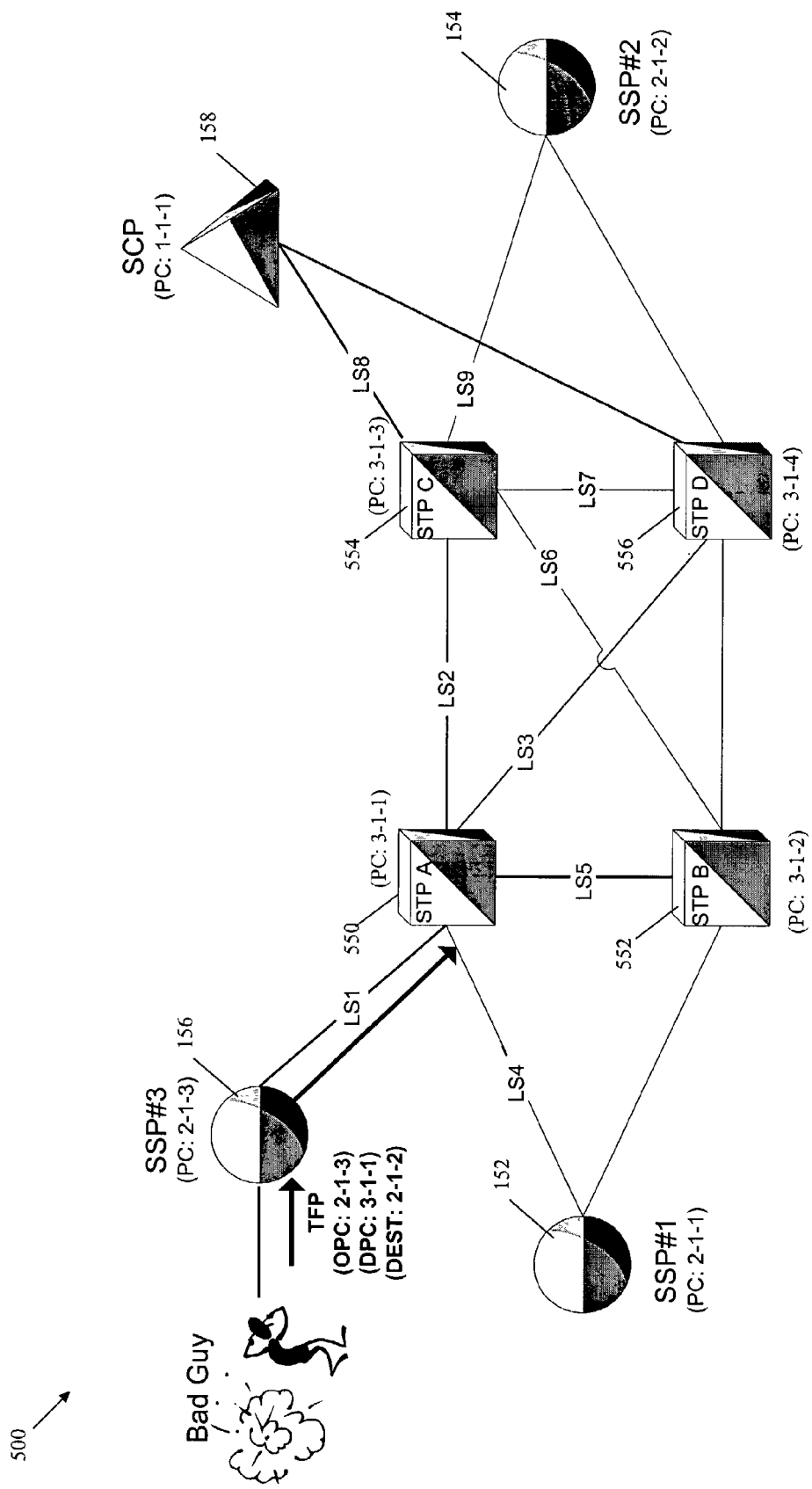
FIG. 7 is a network diagram illustrating a network diagram illustrating prevention of an exemplary MTP level network management message security breach scenario by a network security function according to an embodiment of the present invention.

FIG. 7 illustrates an exemplary signaling network 500 and one adverse signaling network messaging scenario that is mitigated by the enhanced MTP network management security algorithm of the present invention. In FIG. 7, signaling network 500 includes a first SSP node 152 with a point code of 2-1-1, a second SSP node 154 with a point code of 2-1-2, and a third SSP node 156 with a network point code address of 2-1-3. Network 500 further includes an SCP 158 with a point code of 1-1-1 and a provisioned subsystem 12, an STP A node 550 with a point code of 3-1-1, an STP B node 552 with a point code of 3-1-2, an STP C node 554 with a point code of 3-1-3, and an STP D node 556 with a point code of 3-1-4.

SSP 152 is adjacent and connected to STP A 550 via signaling linkset 4 (LS4). SSP 156 is adjacent and connected to STP A 550 via LS1. STP A 550 is adjacent and connected to STP B 552 via LS5, STP C 554 via LS2, and STP D 556 via LS3. STP C 554 is adjacent and connected to STP B 552 via LS6, STP D 556 via LS7, SCP 158 via LS8, and SSP 154 via LS9. For purposes of illustration, the routing information presented in Table 1 is assumed to apply to STP A node 550, while Table 6 provided below contains SS7 routing information for STP C node 554.

TABLE 6

Sample SS7 Routing Data
SS7 Route Table

| KEY | DATA FIELDS | | | | | |
|---|---|---|---|---|---|---|
| Point Code | Route Cost | Adj Node | LinkSet Status | Adjacent Status | Overall Status | LinkSet Name |
| 1-1-1 | 10 | Yes | A | A | A | LS8 |
| 1-1-1 | 20 | Yes | A | A | A | LS7 |
| 2-1-2 | 10 | Yes | A | A | A | LS9 |
| 2-1-2 | 20 | Yes | A | A | A | LS7 |
| 3-1-1 | 10 | Yes | A | A | A | LS2 |
| 3-1-1 | 20 | Yes | A | A | A | LS6 |
| 1-1-2 | 10 | No | A | A | A | LS2 |
| 2-1-1 | 10 | No | A | A | A | LS2 |
| 2-1-3 | 10 | No | A | A | A | LS2 |

As illustrated in FIG. 7, a security breach at SSP 156 would allow an attacker to insert malicious MTP network management messages into the signaling network. Such malicious MTP network management messages could include any of the messages listed above in Table 3. Without the enhanced security algorithms of the present invention, such network management messages could adversely affect nodes other than SSP 156. As will now be described, the present invention prevents network management messages originating from one point in the network from adversely affecting other nodes in the network.

In the example shown in FIG. 7, a malicious TFP message is generated by an attacker seeking to prevent other nodes from communicating with SSP 154. Such a TFP message may include the OPC of SSP 156 (i.e., 2-1-3), a DPC of STP A node 554 (i.e., 3-1-1) and a destination parameter value equal to the point code of SSP 154 (i.e., 2-1-2). The malicious TFP message is communicated across signaling linkset 1 (LS1) to STP A node 550. STP A receives the malicious TFP and executes the enhanced MTP network management message security algorithm of the present invention. Referring to FIG. 6, in step ST3 the NM message is not identified as a UPU, TFC, or RCT message In step ST4, the OPC of the message is examined and determined to be associated with an adjacent node (i.e., SSP 156 is directly connected to STP C 554) using routing information in Table 6. In step ST5, it is determined whether there is a route to the OPC on the received linkset. The OPC in the message is 2-1-3, which corresponds to SSP 156 connected to STP A 550 on LS1. Accordingly, the linkset table should indicated that a route exists to OPC 2-1-3 on linkset 1, and this step in the security algorithm is passed.

Control then proceeds to step ST6 where the security screening algorithm determines whether the message is an RSM message. In this example, the message is a TFP message rather than an RSM message. Accordingly, control proceeds to step ST7, where it is determined whether a route exists on LS1 to the point code 2-1-2 specified in the destination field of the message. There should be no such route because in the network illustrated in FIG. 7, there is no way to get to 2-1-2 on LS1. Accordingly, this step fails and the security algorithm fails the message and performs an appropriate security action, such as discarding the message and alerting the network operator. Thus, as illustrated in FIGS. 6 and 7, the MTP portion of the security screening algorithm prevents an attacker from originating malicious MTP3 network management messages into a network that affect nodes at other points in the network.

Enhanced SCCP Subsystem Management Message Security Algorithm

The following rules may be implemented by a security algorithm of the present invention to protect a network from malicious SCCP management messages.

For a received SCCP level subsystem management message, the security algorithm preferably verifies that:
1) The receiving STP has a route to the OPC of the SCCP subsystem management message on the linkset over which the message was received; and
2) The receiving STP has a route to the affected point code in the message (if the received message contains affected point code parameter information) on the linkset over which the message was received.

For all link types, the following additions/exceptions apply:
Rules 1 & 2 do not apply to SSA, SST, SOG, SBR, SNR and SRT messages.

Figure 8:
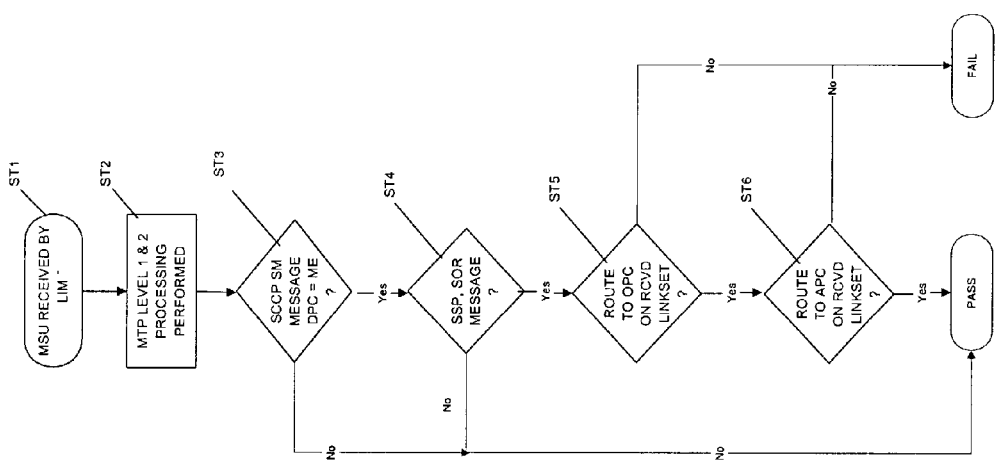
FIG. 8 is a flow chart diagram that illustrates message processing associated with an SCCP level enhanced security function according to an embodiment of the present invention.

The SCCP management security algorithm of the present invention may be implemented in NSE function 316 on each LIM in the STP 300, as illustrated in FIG. 3. FIG. 8 is process flow diagram that illustrates the SCCP level subsystem management message security algorithm of the present invention. In step ST1, an SS7 MSU is received at LIM 306 of STP 300 on an inbound signaling linkset. MTP level 1 and 2 processing is performed (ST2) via MTP function 312, and the MSU is passed to I/O message buffer 314. I/O buffer 314 subsequently directs the message to NSE function 316 for application of the enhanced security algorithms of the present invention. NSE function 316 receives the message, decodes the message, and examines various parameters in the message, including at least some of the parameters illustrated in FIG. 5. For example, the DPC parameter 458 and SI parameter 456 are examined to determine whether the received message is an SCCP message (i.e., SI=3) that is destined for STP 300. If the message is identified as an SCCP message destined for the receiving STP node 300, the SCCP message type parameter 462 is examined. If it is determined that the SCCP message is a Unitdata message, the SCCP message type parameter 462 may be examined to determine whether the message is intended for an SCCP subsystem management (SCMG) process. Step ST3 in FIG. 8 is intended to collectively represent these steps.

If it is determined that the message is associated with SCCP subsystem management operations, SCCP subsystem management message type parameter 468 is next examined to determine the particular SCCP subsystem management message contained in the received MSU. If the SCCP subsystem management message is determined to be an SSA, SST, SOG, SBR, SNR or SRT message, then enhanced security algorithm of the present invention "passes" the message and concludes processing of this message. Again, it will be appreciated that once enhanced security processing has passed a message and concluded, gateway screening may be subsequently performed.

If the SCCP subsystem management message is determined to be an SSP or SOR message (ST4), then a determination is next made as to whether a route to the OPC specified in the message is defined on the same signaling linkset over which the message was received (ST5). Such a determination is made by examining the SS7 route table on LIM 306, which may contain data similar to that illustrated in Table 1 above.

If it is determined that a route to the OPC specified in the message is not defined on the same signaling linkset over which the message was received, then the message fails the enhanced security algorithm and invokes one or more network security actions in response to the failure. If it is determined that a route to the OPC specified in the message is defined on the same signaling linkset over which the message was received, then the message is examined to determine the value of an affected point code parameter (if the affected point code parameter is present in the message). Using the point code specified in the affected point code parameter, it is then determined whether a route to the affected point code is defined on the same signaling linkset over which the message was received (ST6). Like the check for the destination parameter illustrated in FIG. 6, the check as to whether a route exists to the affected point code on the received linkset ensures that an attacker cannot insert subsystem management messages into the network from one location that relate to another location of which the node at the first location should not have knowledge. If such insertion were allowed, an attacker could insert malicious SCCP subsystem management messages into the network from one location that adversely affect SCCP subsystems at other locations.

Accordingly, if it is determined that a route to the affected point code address is not defined on the same signaling linkset over which the message was received, then the message fails the enhanced security algorithm and triggers one or more network security actions in response to the security failure. If it is determined that a route to the affected point code address specified in the message is defined on the same signaling linkset over which the message was received, then the enhanced security algorithm "passes" the message and concludes processing for the message. Once enhanced security processing has passed a message and concluded for the message, conventional gateway screening may be performed.

Figure 9:
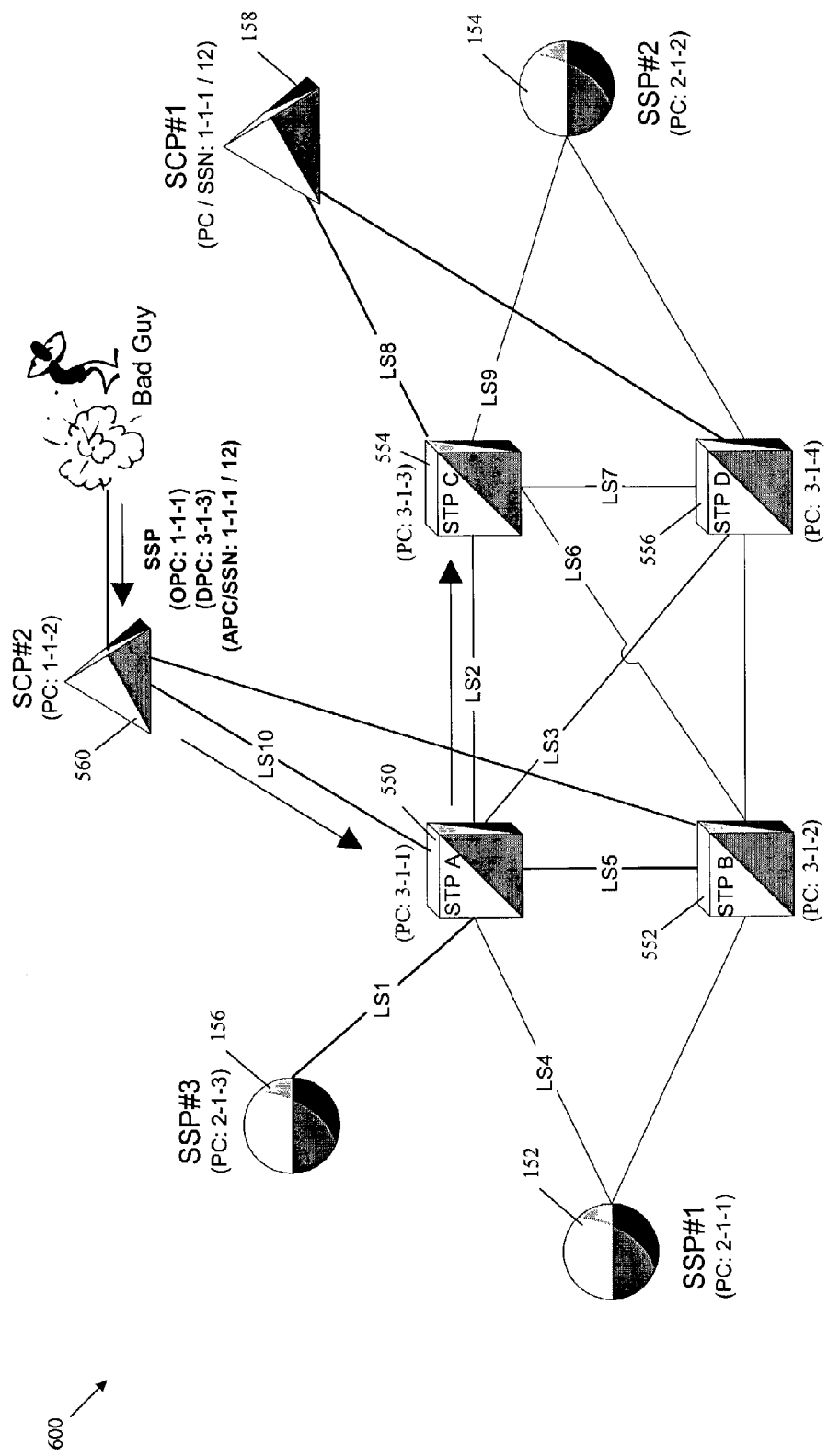
FIG. 9 is a network diagram illustrating a network diagram illustrating prevention of an exemplary SCCP level subsystem management message security breach by a network security function according to an embodiment of the present invention.

FIG. 9 illustrates an exemplary signaling network 600 and one adverse signaling network messaging scenario that is mitigated by the enhanced SCCP subsystem management security algorithm of the present invention. Exemplary signaling network 600 includes a first SSP node 152 with a point code of 2-1-1, a second SSP node 154 with a point code of 2-1-2, and a third SSP node 156 with a point code of 2-1-3. Network 600 further includes a first SCP 158 with a point code of 1-1-1 and a provisioned subsystem 12, a second SCP 560 with a point code of 1-1-2, an STP A node 550 with a point code of 3-1-1, an STP B node 552 with a point code of 3-1-2, an STP C node 554 with a point code of 3-1-3, and an STP D node 556 with a point code of 3-1-4.

SSP 152 is adjacent and connected to STP A 550 via signaling linkset 4 (LS4). SSP 156 is adjacent and connected to STP A 550 via LS1. STP A 550 is adjacent and connected to STP B 552 via LS5, STP C 554 via LS2, STP D 556 via LS3, and SCP 560 via LS10. STP C 554 is adjacent and connected to STP B 552 via LS6, STP D 556 via LS7, SCP 158 via LS8, and SSP 154 via LS9. For the purposes of illustration, the routing information presented in Table 1 is assumed to apply to STP A node 550, while Table 6 provided above contains SS7 routing information for STP C node 554.

As illustrated in FIG. 9, a security breach at SCP 560 could allow an attacker to insert malicious SCCP subsystem management messages into the signaling network. Such malicious SCCP subsystem management messages may include any of the messages listed above in Table 5. In the particular example shown in FIG. 9, a malicious SSP (subsystem prohibited) message is generated by an attacker to disable a subsystem located at a different node from which the message originated. In this example, the SSP message includes the OPC of SCP 158 (i.e., 1-1-1), the DPC of STP C node 554 (i.e., 3-1-3) and affected point code and SSN parameter values equal to the point code and SSN of SCP 158 (i.e., 1-1-$\frac{1}{12}$). If such malicious SCCP subsystem management messages are allowed to propagate through the network, an attacker could make it appear as though many or all SCP service nodes in a network were prohibited or congested from a single location in the network, which could prevent communications with these nodes. The present invention prevents such malicious SCCP management messages originating from one locations from adversely affecting other locations, as will now be described in detail.

In the example scenario shown in FIG. 9, the malicious SSP message is inserted into the network from SCP node 560. The malicious SSP message is communicated across signaling linkset 10 (LS10) to STP A node 550. STP A receives the malicious SSP and executes the enhanced SCCP subsystem management message security algorithm of the present invention. Referring to FIG. 8, it will be appreciated that because the received NM message is not addressed to STP A's point code (i.e., DPC is not equal to 3-1-1) the enhanced security algorithm "passes" the message (ST3). As mentioned previously, gateway screening may be performed following execution of the enhanced security algorithm. However, for the purposes of illustration, only the enhanced security algorithms are considered herein.

Consequently, STP A node 550 routes the malicious SSP message via linkset LS2 to STP C node 554, as indicated in FIG. 9. STP C receives the malicious SSP and executes the enhanced SCCP subsystem management message security algorithm of the present invention. Referring again to FIG. 8, it will be appreciated that, in this instance, the received subsystem management message is addressed to the receiving STP's point code (i.e., the DPC is equal to 3-1-3), and the subsystem management message is identified as an SSP message (steps ST3 and ST4). In step ST5, the OPC in the message is examined and it is determined that a route to OPC 1-1-1 does not exist on LS2. Consequently, the malicious SSP message fails the enhanced security algorithm. It will be appreciated the message would also have failed step ST6, as the point code contained in the affected point code field (1-1-1) is not accessible via linkset LS2 (i.e., the linkset over which the message was communicated to STP C). From Table 6 above, the only routes from STP C to 1-1-1 are via linksets LS7 and LS8. In any event, the "failed" message may be discarded and an alarm message may be generated and forwarded to a network operations center. Thus, as illustrated in FIGS. 8 and 9, the security algorithm of the present invention also prevents malicious SCCP subsystem management messages originating from one subsystem from adversely affecting other subsystems in the network.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for screening subsystem management messages in a telecommunications network, the method comprising:
   (a) receiving, at a network node, a subsystem management message originating from a location in a telecommunications network;
   (b) comparing a predetermined parameter in the subsystem management message with stored routing information to determine whether the predetermined parameter in the subsystem management message is not associated with the originating location; and
   (c) in response to determining that the parameter is not associated with the
   (d) originating location, performing a network security action for the subsystem management message.

2. The method of claim 1 wherein receiving a subsystem management message includes receiving an SCCP subsystem management message.

3. The method of claim 2 wherein receiving an SCCP subsystem management message includes receiving a subsystem prohibited message or subsystem out of service request.

4. The method of claim 1 wherein performing a network security action includes discarding the message.

5. The method of claim 1 wherein performing a network security action includes alerting a network operator that the subsystem management message failed security screening.

6. The method of claim 1 wherein steps (a)–(c) are performed at a signal transfer point.

7. A method for screening subsystem management messages in a communications network, the method comprising:
   (a) receiving, at a network node, a subsystem management message originating from a location in a network;
   (b) determining whether a predetermined parameter in the subsystem management message is not associated with the originating location, wherein determining whether the parameter in the subsystem management message is not associated with the originating location includes extracting an OPC from the subsystem management message and determining whether a route to the OPC exists on a linkset from which the subsystem management message was received; and
   (c) in response to determining that the parameter is not associated with the originating location, performing a network security action for the subsystem management message.

8. The method of claim 7 wherein performing a network security action includes performing a network security action in response to determining that a route to the OPC does not exist on the linkset from which the subsystem management message was received.

9. A method for screening subsystem management messages in a communications network, the method comprising:
   (a) receiving, at a network node, a subsystem management message originating from a location in a network;
   (b) determining whether a predetermined parameter in the subsystem management message is not associated with the originating location, wherein determining whether the parameter in the subsystem management message is not associated with the originating location includes extracting an affected point code parameter from the message and determining whether a route to the affected point code parameter exists on a linkset from which the subsystem management message was received; and
   (c) in response to determining that the parameter is not associated with the originating location, performing a network security action for the subsystem management message.

10. The method of claim 9 wherein performing a network security action includes performing a network security action in response to determining that a route to the affected point code parameter does not exist for the linkset on which the subsystem management message was received.

11. A routing node having a screening function for protecting a network against malicious network management messages, the routing node comprising:
   (a) a link interface module for receiving network management messages from originating locations in a telecommunications network; and
   (b) a network security function operatively associated with the link interface module for comparing one or more predetermined parameters in each network management message with stored routing information and determining, based on the comparison, whether the one or more predetermined parameters in each network management message are not associated with the originating location for the message, and, in response to determining that one or more of the parameters are not associated with the originating location, for performing a network security action.

12. The routing node of claim 11 wherein the link interface module comprises an SS7 link interface module for sending and receiving SS7 network management messages over SS7 signaling links.

13. The routing node of claim 11 wherein the link interface module comprises an IP interface module for sending and receiving IP-encapsulated SS7 network management messages over IP-based signaling links.

14. The routing node of claim 11 wherein the network security function is adapted to discard a network management message containing one of the predetermined parameters not associated with the originating location.

15. The routing node of claim 11 wherein the network security function is adapted to notify a network operator of a network management message containing one of the predetermined parameters not associated with the originating location.

16. A routing node having a screening function for protecting a network against malicious network management messages, the routing node comprising:
    (a) a link interface module for receiving network management messages from originating locations in a network; and
    (b) a network security function operatively associated with the link interface module for determining whether one or more predetermined parameters in each network management message are not associated with the originating location for the message, and, in response to determining that one or more of the parameters are not associated with the originating location, for performing a network security action, wherein the network security function is adapted to examine an OPC parameter in each received network management message to determine whether the OPC is associated with a node adjacent to the routing node, and, in response to determining that the OPC parameter is not associated with an adjacent node, for performing the network security action.

17. A routing node having a screening function for protecting a network against malicious network management messages, the routing node comprising:
    (a) a link interface module for receiving network management messages from originating locations in a network; and
    (b) a network security function operatively associated with the link interface module for determining whether one or more predetermined parameters in each network management message are not associated with the originating location for the message, and, in response to determining that one or more of the parameters are not associated with the originating location, for performing a network security action, wherein the network security function is adapted to examine an OPC parameter in each received network management message to determine whether a route to the OPC exists on a signaling linkset from which the network management message was received, and, in response to determining that a route does not exist on the linkset, for performing the network security action.

18. A routing node having a screening function for protecting a network against malicious network management messages, the routing node comprising:
    (a) a link interface module for receiving network management messages from originating locations in a network; and
    (b) a network security function operatively associated with the link interface module for determining whether one or more predetermined parameters in each network management message are not associated with the originating location for the message, and, in response to determining that one or more of the parameters are not associated with the originating location, for performing a network security action, wherein the network security function is adapted to examine a destination parameter in each received network management message to determine whether a route to the destination parameter exists on a signaling linkset from which the network management message was received, and, in response to determining that a route does not exist on the linkset, for performing the network security action.

19. A routing node having a screening function for protecting a network against malicious subsystem management messages, the routing node comprising:
    (a) a link interface module for receiving subsystem management messages from originating locations in a telecommunications network; and
    (b) a network security function operatively associated with the link interface module for comparing one or more predetermined parameters in each network management message with stored routing information and determining, based on the comparison, whether the one or more predetermined parameters in each subsystem management message are not associated with the originating location for the message, and, in response to determining that one or more of the parameters are not associated with the originating location, for performing a network security action.

20. The routing node of claim 19 wherein the link interface module comprises an SS7 link interface module for sending and receiving SS7 subsystem management messages over SS7 signaling links.

21. The routing node of claim 19 wherein the link interface module comprises an IP interface module for sending and receiving IP-encapsulated SS7 subsystem management messages over IP-based signaling links.

22. The routing node of claim 19 wherein the network security function is adapted to discard each subsystem management message containing at least one of the predetermined parameters not associated with the originating location.

23. The routing node of claim 19 wherein the network security function is adapted to notify a network operator of each subsystem management message containing at least one of the predetermined parameters not associated with the originating location.

24. A routing node having a screening function for protecting a network against malicious subsystem management messages, the routing node comprising:
    (a) a link interface module for receiving subsystem management messages from originating locations in a network; and
    (b) a network security function operatively associated with the link interface module for determining whether one or more predetermined parameters in each subsystem management message are not associated with the originating location for the message, and, in response to determining that one or more of the parameters are not associated with the originating location, for performing a network security action, wherein the network security function is adapted to examine an OPC parameter in each received subsystem management message to determine whether a route to the OPC exists on a signaling linkset from which the subsystem management message was received, and, in response to determining that a route does not exist on the linkset, for performing the network security action.

25. A routing node having a screening function for protecting a network against malicious subsystem management messages, the routing node comprising:
    (a) a link interface module for receiving subsystem management messages from originating locations in a network; and
    (b) a network security function operatively associated with the link interface module for determining whether one or more predetermined parameters in each subsystem management message are not associated with the originating location for the message, and, in response to determining that one or more of the parameters are not associated with the originating location, for performing a network security action, wherein the network security function is adapted to examine an affected point code parameter in each received subsystem management message to determine whether a route to the affected point code exists on a signaling linkset from which the subsystem management message was received, and, in response to determining that a route does not exist on the linkset, for performing the network security action.

26. A method for screening network management messages in a telecommunications network, the method comprising:
  (a) receiving, at a network node, a network management message originating from a location in a telecommunications network;
  (b) determining, based on a predetermined parameter in the network management message, whether a route that corresponds to the predetermined parameter matches a linkset over which the network management message was received; and
  (c) in response to determining that the route that corresponds to the predetermined parameter does not match the linkset over which the network management message was received, performing a network security action for the network management message.

27. The method of claim 26 wherein receiving a network management message includes receiving an MTP3 network management message.

28. The method of claim 27 wherein receiving an MTP3 network management message includes receiving a transfer prohibited message.

29. The method of claim 26 wherein determining whether a route that corresponds to the predetermined parameter matches a linkset over which the network management message was received includes extracting an OPC from the network management message and determining whether a route to the OPC matches the linkset.

30. The method of claim 29 wherein performing a network security action includes performing a network security action in response to determining that a route to the OPC does not match the linkset.

31. The method of claim 26 wherein determining whether a route that corresponds to the predetermined parameter matches a linkset over which the network management message was received includes extracting a destination parameter from the message and determining whether a route to the destination parameter matches the linkset.

32. The method of claim 31 wherein performing a network security action includes performing a network security action in response to determining that a route to the destination parameter does not match the linkset.

33. The method of claim 26 wherein performing a network security action includes discarding the message.

34. The method of claim 26 wherein performing a network security action includes alerting a network operator that the network management message failed security screening.

35. The method of claim 26 wherein steps (a)–(c) are performed at a signal transfer point.

* * * * *